United States Patent [19]

Cowles

[11] Patent Number: 4,947,535
[45] Date of Patent: Aug. 14, 1990

[54] METHOD WHICH PROVIDES FOR THE PLACEMENT OF A BIT POINT OF A BIT AT A PREDETERMINED POSITION

[75] Inventor: Dennis Cowles, Broadview Heights, Ohio

[73] Assignee: Joy Technologies, Inc., Pittsburgh, Pa.

[21] Appl. No.: 386,366

[22] Filed: Jul. 27, 1989

Related U.S. Application Data

[62] Division of Ser. No. 174,599, Mar. 29, 1988, Pat. No. 4,897,904.

[51] Int. Cl.$^5$ .............................................. B21D 39/03
[52] U.S. Cl. ...................................... 29/428; 29/455.1; 266/77; 300/21
[58] Field of Search ............... 29/428, 33 K, 563, 564, 29/407, 148.4 D, 455.1, 429, 430; 266/77; 76/101 A; 300/3, 21

[56] References Cited

U.S. PATENT DOCUMENTS

| | | | |
|---|---|---|---|
| 3,388,901 | 6/1968 | Ferguson | 266/77 X |
| 3,572,669 | 3/1971 | Brand | 266/77 X |
| 3,806,691 | 4/1974 | Roach | 266/77 X |
| 4,437,221 | 3/1984 | Bompard | 300/21 X |
| 4,715,250 | 12/1987 | Rosemann | 76/101 A |

Primary Examiner—Timothy V. Eley
Attorney, Agent, or Firm—Cohen & Grigsby

[57] ABSTRACT

The present invention pertains to a method which provides for the placement of a bit point of a bit at a predetermined position with respect to a rotatable member. The method includes the steps of burning into a holder a surface which corresponds to a portion of the surface of the member; and fixing the holder on the member such that the surface burned into the holder is adjacent the portion of the surface of the member, and the bit point of the bit is capable of being held by the holder at the predetermined position. The present invention also pertains to an apparatus which provides for the placement of a bit point of a bit at a predetermined position with respect to a rotatable member. The apparatus includes a holder for holding a bit, and a device for burning into the holder a surface which corresponds to a portion of the surface of the member. The apparatus also includes a device for aligning the holder on the member such that the surface burned into the holder is adjacent the portion of the surface of the member, and the bit point of the bit is capable of being held by the holder at the predetermined position.

13 Claims, 5 Drawing Sheets

METHOD WHICH PROVIDES FOR THE PLACEMENT OF A BIT POINT OF A BIT AT A PREDETERMINED POSITION

This is a divisional of co-pending application Ser. No. 07/174,599 filed on Mar. 29, 1988 now Pat. No. 4,897,904.

This invention is directed to locating a plurality of offset points with reference to a peripheral surface or portions of a peripheral surface. Although the invention is to such locating it is believed easier to understand with reference to cutter bits for rotating drums of a coal mining machine for which the invention was initially developed. Accordingly, such bits and drums are described herein as the presently preferred embodiment of the invention.

In the mining of coal it is accepted practice to arrange cutter bits on a traveling or rotating member, such as a cutter chain or a rotating drum, such that the cutting edges or tips of the cutter bits travel through separate paths in the coal seam to be mined. There are various factors regarding the cutting of coal seams which are evaluated by various manufacturers of mining machinery in locating cutter bits on a rotating member. The locating of the cutter edges or cutting points of a cutter bit is referred to as the "lacing" of a cutter chain or drum and varies among various machinery manufacturers; however, all machinery manufacturers want as accurate locating of the cutter edge or point as is possible under the various manufacturing process. As is also known cutter bits have various forms of cutting edges with the conical or pointed bit being the preferred form of bit used by the Joy Technologies Inc. for which this invention was developed. It is to be realized that the principles of this invention are equally applicable to a linear edged bit since the center of the linear length is equivalent to the tip or pointed end of a conical bit. Accordingly, further description of this invention is with reference to a conical bit having an outer cutter bit point. Also a bit point is a point which is an outermost point of a bit.

Cutter drums vary in design for various mining machines including machines manufactured by a specific manufacturer. As is known, a cutting drum may consist of elongated drum sections, end sections and ring sections between the drum and end sections. The drum, end and ring segments form a cutter head with various cutter head designs being utilized. Regardless of the design of a cutter head or cutting chain it is necessary that the cutter head or chain cut its own clearance. That is, the bits on the cutter head cut and break the coal, rock or earth such that the cutter head can be moved forward into a coal seam. In this regard it is to be noted that coal is a frangible material and that the path of movement of a cutter bit through a coal seam to cause coal breakage is an important aspect of proper lacing of the cutting bits on a drum or cutter chain. Also, each section of a cutter head must carry cutter bits to cut its own clearance. A cutter head which cannot cut clearance for itself is not an acceptable mining machine.

Inasmuch as the principles of this invention in locating bit points (i.e., the points of the bits) applied to cutting chains and the sections of a cutter head the prior methods and apparatus for locating cutter bits on a cutter head are discussed for the sake of simplicity in understanding the invention. It is not believed necessary to discuss each aspect of the prior methods and apparatus since the more significant aspects of the prior art are discussed herein. It is also to be borne in mind that diameters and lengths of a cutter drum section vary so that while the procedures discussed are the same the tools and aids utilized will vary to compensate for the variations in drum diameter. It is also to be noted that a drum section carries various bit blocks at various locations which receive the bits, and pedestals upon which the bit blocks are mounted. The geometry of the bit blocks and bits is known and, for a specific combination, fixed.

In the past, it has been accepted practice to design each section of a cutting head to carry cutter blocks which specified the location of each block being specified. Once such drawings were received by the manufacturer the bit blocks were secured to the drum section by suitable welding processes such as arc welding. It is not known what processes other manufacturers may employ; however, in the case of Joy Technologies, hand locating of the bit blocks on the drum section was utilized. Various gages were used to locate the bit blocks. It is to be realized that the bit blocks are formed from castings or forging with a specific lower surface which lower surface is secured to the drum section. Although a bit block is preferably formed with a concave lower surface there is no one concave surface which will provide a good fit with all diameters of drum sections or the various angles to the rotation axis of the drum segment at which the bit blocks entered. Consequently it was necessary in the past to essentially hand fit the various bit blocks to the drum segments by cutting off sections of the lower portion of the bit blocks. Torch cutting of bit blocks based upon estimates of the desired curvature of the lower surface of the bit block are quite unsatisfactory. In many instances filler materials were utilized to hold portions of the bit blocks relative to the drum surface prior to tack welding. Consequently, the tolerance on the bit point was quite large to compensate for the difficulties in locating the bit blocks and, in turn, the bit points.

SUMMARY OF THE INVENTION

The present invention pertains to a method which provides for the placement of a bit point of a bit at a predetermined position with respect to a rotatable member. The method comprises the steps of burning into a holder a surface which corresponds to a portion of the surface of the member; and fixing the holder on the member such that the surface burned into the holder is adjacent the portion of the surface of the member, and the bit point of the bit is capable of being held by the holder at the predetermined position. The present invention also pertains to an apparatus which provides for the placement of a bit point of a bit at a predetermined position with respect to a rotatable member. The apparatus comprises a holder for holding a bit, and means for burning into the holder a surface which corresponds to a portion of the surface of the member. The apparatus also comprises means for aligning the holder on the member such that the surface burned into the holder is adjacent the portion of the surface of the member, and the bit point of the bit is capable of being held by the holder at the predetermined position.

Other details, objects and advantages of the invention will become apparent as the following description of the presently preferred embodiments and presently preferred methods of practicing the invention proceeds.

BRIEF DESCRIPTION OF THE DRAWINGS

In the accompanying drawings, the preferred embodiments of the invention and preferred methods of practicing the invention ar illustrated in which:

FIGS. 6a through 6h show a bit block mounted on a pedestal having a bit point of a bit that is capable of being held by the bit block at various predetermined positions.

DESCRIPTION OF THE PREFERRED EMBODIMENT

Figure 1:
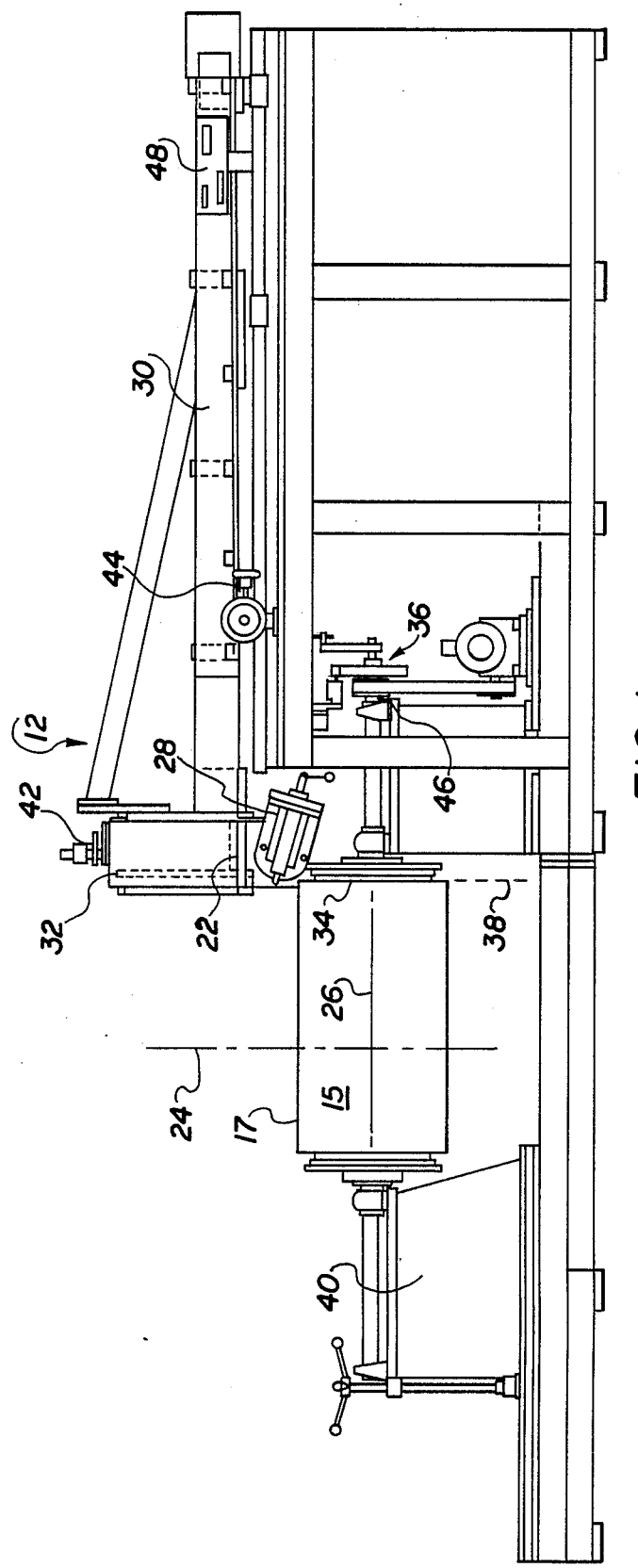
FIG. 1 is a side view of a drum lacing fixture.
Figure 3:
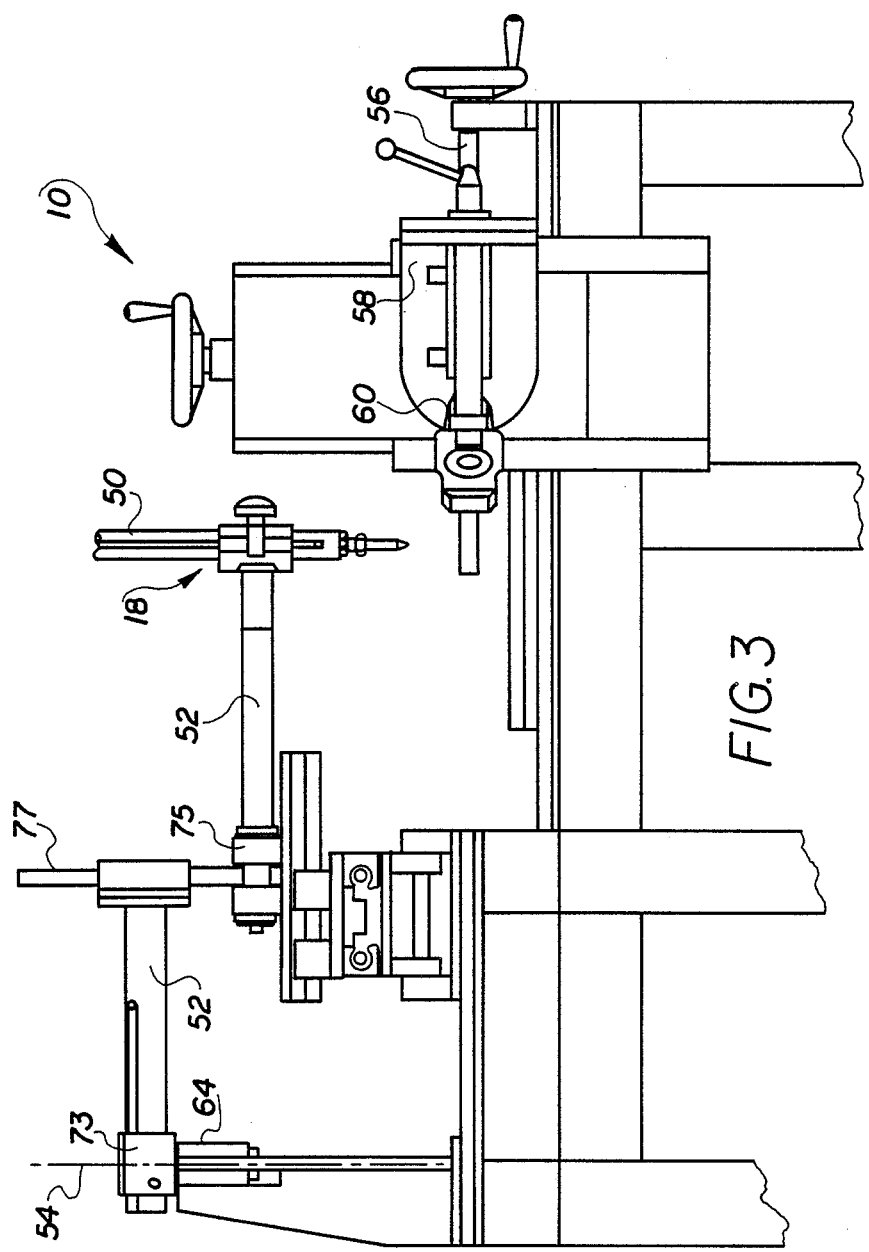
FIG. 3 is a side view of a burning machine.

Referring now to the drawings, wherein like reference numerals designate identical or corresponding parts throughout the several views, and more particularly to FIGS. 1 and 3 thereof, there is shown an apparatus which provides for the placement of a bit point of a bit at a predetermined position with respect to a rotatable member. The apparatus comprises a holder for holding a bit, and means 10 for burning into the holder a surface which corresponds to a portion of the surface of the member. The apparatus also is comprised of means 12 for aligning the holder on the member such that the surface burned into the holder is adjacent the portion of the surface of the member, and the bit point of the bit is capable of being held by the holder at the predetermined position. Preferably, the rotatable member is a drum 15, and the surface burned into the holder has a radius of curvature corresponding to the radius of curvature of the surface 17 of the drum 15. The holder can be, for instance, a bit block 16 and is preferably comprised of a pedestal 14 and a bit block 16, see FIGS. 6a–6h.

The burning means can include means 18 for burning into the pedestal 14 a surface 20 having a shape which corresponds to the shape of the surface 17 of the drum 15 upon which the pedestal is placed. Preferably, the surface 20 has a radius of curvature, and the drum surface 17 has a radius of curvature. The aligning means 12 is capable of aligning the bit block 16 with respect to the surface of the drum such that the bit point of a bit is capable of being held by the bit block 16 at the predetermined position after it is attached to the pedestal 14 and the pedestal 14 is attached to the surface 17 of the drum 15. The aligning means 12 is also capable of aligning the bit block 16 with respect to the surface 17 of the drum 15 such that the bit block 16 can be attached directly to surface 17 of the drum 15, if no pedestal 14 is used.

Figure 2:
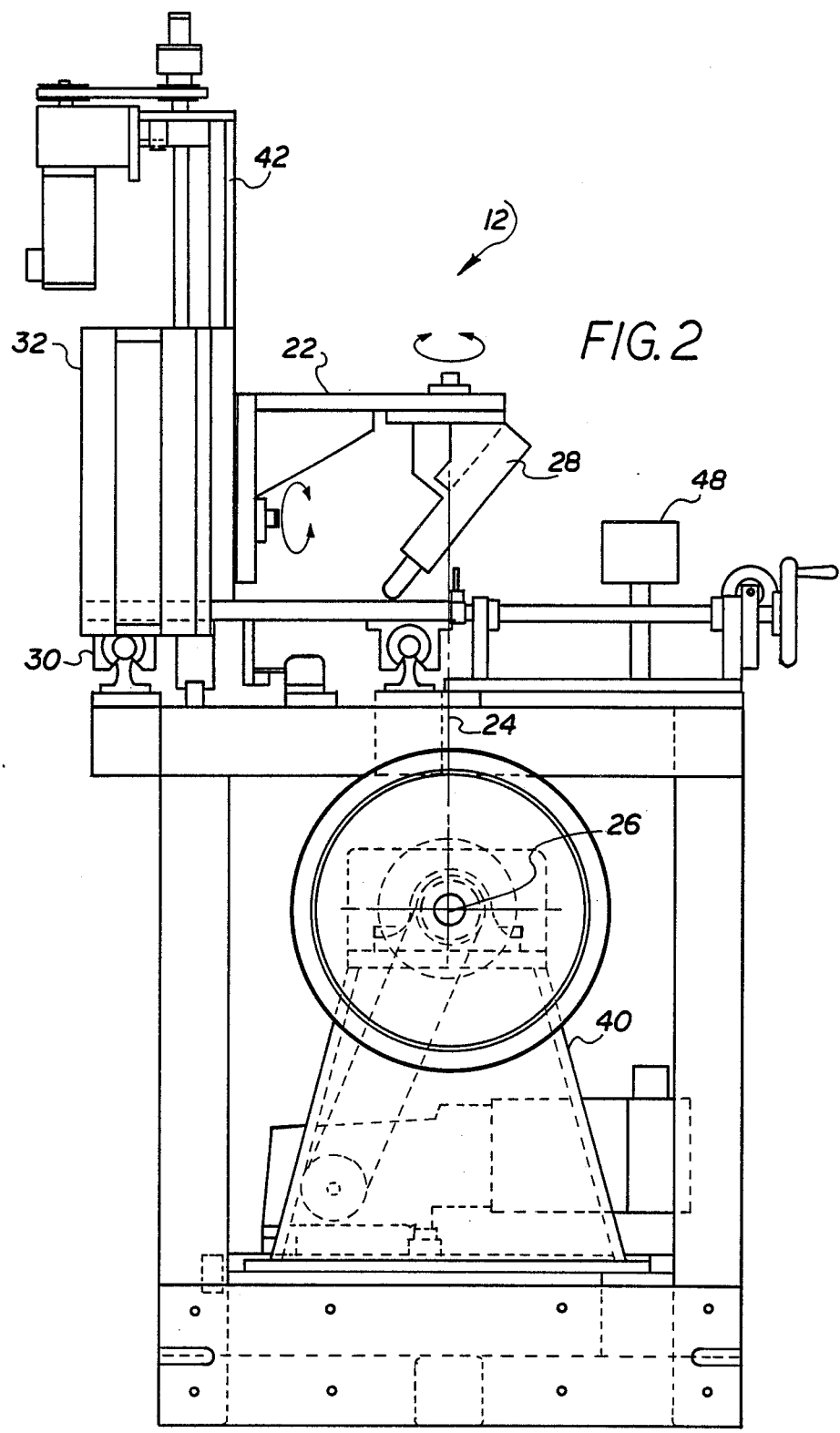
FIG. 2 is an axial view of the drum lacing fixture.

The aligning means 12 can include means 22 for positioning the bit block 16 at a predetermined angle $\phi$ from a first prechosen line 24, see FIG. 2. The first prechosen line 24 extends perpendicularly from the axis 26 of the drum and through the bottom of the bit block 16. Preferably, a nipple 28 holds the bit block 16 such that the bit point of the bit is capable of being held by the bit block 16 at a predefined position relative to the nipple 28. The nipple 28 is rotatably attached to the means 22 for positioning the bit block 16 at the predetermined angle $\phi$. Preferably, the means 22 for positioning the bit block 16 at the predetermined angle $\phi$ is a first swivel head 2a.

The aligning means 12 can also include means 32, for positioning the bit block 16 such that the position of the bit point of the bit with respect to the bit block 16 is at a predetermined distance r from the axis 26 of the drum. There is also included in the aligning means 12 means 30 for positioning the bit block 16 such that the position of the bit point of the bit with respect to the bit block 16 is at a predetermined distance z from a prechosen end 34 of the drum. Additionally, the aligning means 14 includes means 36 for rotating the drum a predetermined angle $\theta$ from a second prechosen line 38 extending perpendicularly from the axis 26 of the drum such that the bit block 16 is capable of being attached to the pedestal 14 at the angle $\phi$ after the pedestal 14 is attached to the surface 17 of the drum 15, and the bit point of the bit is capable of being held by the bit block 16 at the positions r, $\theta$ and z with respect to the drum. (Similarly, as mentioned above, the bit block 16 can be attached directly to the drum surface 17 when no pedestal 14 is used.)

The means 30 for positioning the bit block 16 such that the position of the bit point of the bit with respect to the bit block 16 is at a predetermined distance r from the axis 26 of the drum is preferably a vertical slide which is capable of moving essentially perpendicularly to the axis 26 of the drum 15. The first swivel head is attached to the vertical slide such that when the vertical slide is moved, the first swivel head 24 moves with it. The means 32 for positioning the bit block 16 such that the position of the bit point of the bit with respect to the bit block 16 is the predetermined distance z from the prechosen end 34 of the drum, is preferably a horizontal slide that is capable of moving essentially in parallel with the axis 26 of the drum. The vertical slide is attached to the horizontal slide such that when the horizontal slide is moved, the vertical slide is moved with it.

The aligning means 12 can include a chuck 40 for rotatably supporting the drum 15. The drum 15 is rotatably attached to the chuck 40 at each end of the drum 15 and along the drum axis 26. The chuck 40 is connected to the rotating means 36.

Preferably, the vertical slide includes a vertical rack and pinion mechanism 42 for moving the vertical slide, the horizontal slide includes a horizontal rack and pinion mechanism 44 for moving the horizontal slide and the rotating means 36 is an angular rack and pinion mechanism 46 for rotating the drum.

The aligning means 12 can also include a display 48 for revealing the r, z and $\theta$ position of the bit point of the bit. The display is connected to the vertical slide, the horizontal slide and the chuck. The above described aligning means 12 is known as a drum lacing fixture.

The means 18 for burning into the pedestal 14 the surface 20 can include a torch 50. Also, in the means 18 for burning into the pedestal 14 the surface 20 can be included means 52 for positioning the torch 50 a predetermined distance from axis 54 of rotation, and means 56 for placing the pedestal 14 a predetermined distance from the axis 54 of rotation. The means 56 for placing the pedestal 14 a predetermined distance from the axis 54 of rotation can include means 58 for positioning the pedestal at the predetermined angle $\phi$ with respect to the torch 50. The means 18 for burning into the pedestal 14 the surface 20 may also include a pedestal holder 60 for holding the pedestal 14 such that the bit point of the bit is capable of being at a predefined position relative to the pedestal 14. The pedestal holder 60 is attached to the means 58 for placing the pedestal 14 at the predetermined angle $\phi$. Preferably, the means 58 for placing the pedestal 14 at the predetermined angle $\phi$ is a second swivel head.

A motor is preferably positioned on the axis 54 of rotation. The means 52 for positioning the torch 50 the predetermined distance from the axis 54 of rotation preferably includes an arm whose length can be varied. The arm is attached at one end to the motor and is attached at the other end to the torch 50 such that when the motor operates it causes the arm to rotate about the axis 54 of rotation and the torch 50 to follow a radius a path having a radius of curvature.

Figure 4:
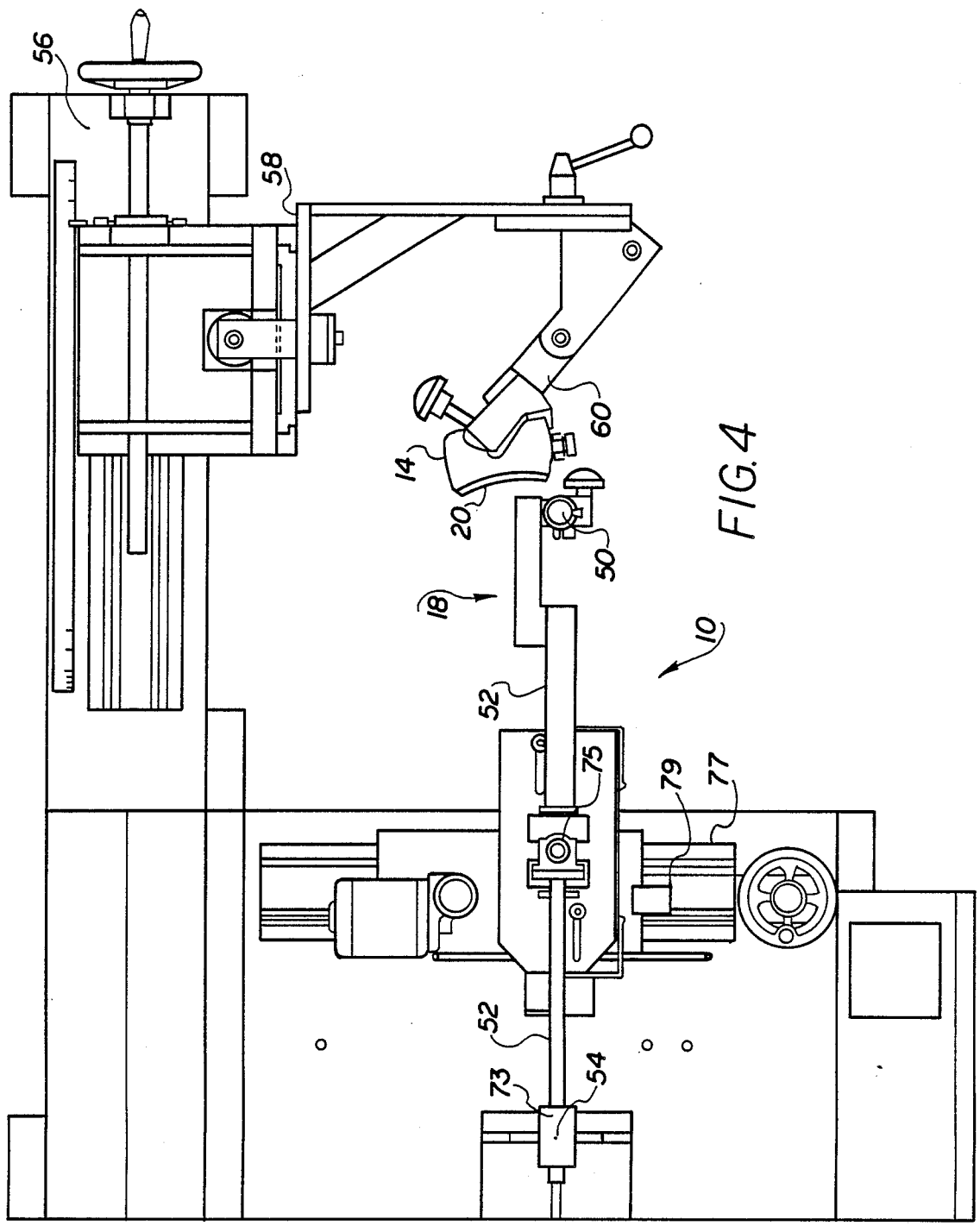
FIG. 4 is an overhead view of a burning machine.
Figures 5, 6:
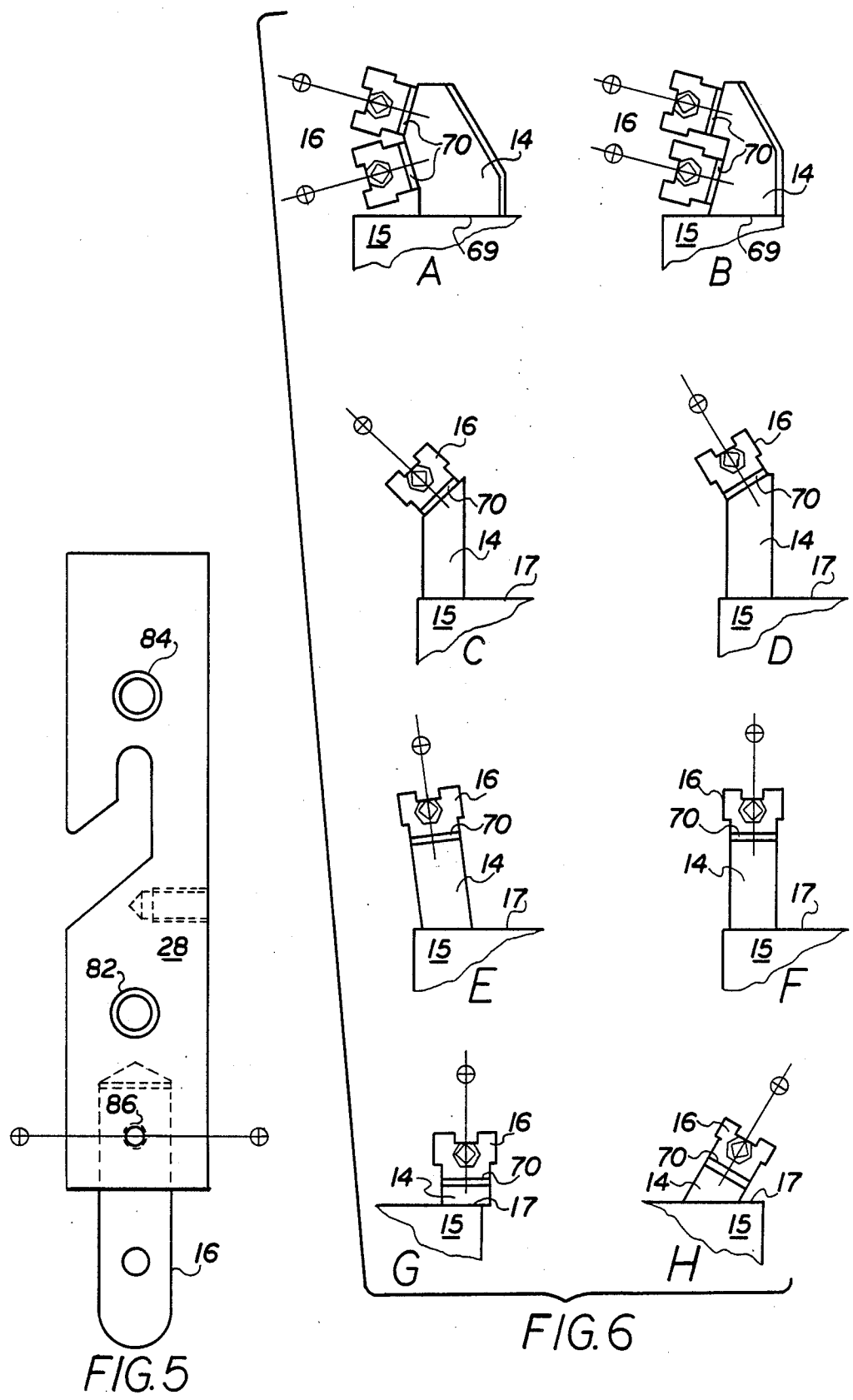
FIG. 5 is a side view of a nipple.

In a preferred embodiment, the arm is attached to a fulcrum point 73 on one end and a first slide 75 at the other end, as shown in FIG. 4. This first slide 75 is mounted on top of and at a 90° angle to a second slide 77. The torch 50 is mounted to the top second slide. The speed and movement of the torch 50 is controlled by the motor 64 mounted on the top second slide and meshed to the first slide through a rack and pinion 79. This preferred embodiment allows a surface that is flat to be burned into the pedestal. This is useful, for instance, when a pedestal 14 is being placed on any end ring 69 of a drum 15 as shown in FIG. 5.

The means 56 for placing the pedestal 14 the predetermined distance from the axis 54 of rotation can include a linear slide that is essentially perpendicular to the axis 54 of rotation. The second swivel head is attached to the linear slide such that the pedestal 14 is capable of being positioned relative to the linear slide so the surface 20 with radius of curvature is capable of being burned into the pedestal 14 by the torch 50 and the bit point of the bit is capable of being at the predefined position relative to the pedestal 14. The above described burning means 12 is known as a burning machine.

The above apparatus has been described in terms of vertical and horizontal, etc. The terms vertical and horizontal here used reflect the relative relationship between the identified elements but not necessarily absolute relationships. Thus, the above apparatus can be turned sidewise or at some angle therefrom and the apparatus (and method described below) would still be operable. The elements thereof and steps thereof would translate and rotate accordingly.

In the operation of the invention, a pedestal 14 is attached to a pedestal holder 60. The pedestal holder 60 is made such that when the pedestal 14 is attached to it, the pedestal 14 is a predefined distance from where the bit point of a bit would be if the pedestal 14 had a bit block 16 attached to it and a bit in the bit block 16. The pedestal holder 60 is then attached to the second swivel head. The second swivel head is rotated such that the pedestal 14 attached to the pedestal holder 60 which is attached to the second swivel head is at a predetermined angle $\phi$ with respect to the torch 50. Note that rotation of the second swivel head does not change the position of the bit point with respect to the pedestal 14.

Next, the length of the arm is set such that when the motor operates, it causes the arm to rotate about the axis 54 of rotation and causes the torch 50, which is attached to one end of the arm, to follow a path having a desired radius of curvature. This radius of curvature corresponds to the radius of curvature of the surface 17 of the drum 15 that the pedestal 14 ultimately is placed upon. This path having a radius of curvature that the torch follows is burned into the pedestal 14 by the torch 50 during the burning process. For a flat burn to occur, the first slide 75 is moved along the second slide 77, but the arm is not rotated.

Before the torch 50 burns the surface 20 having the desired radius of curvature into the pedestal 14, the second swivel head is moved along the linear slide to a predetermined distance from the axis 54 of rotation. More specifically, this predetermined distance with respect to the axis of rotation is measured from where the bit point of a bit would be relative to the pedestal 14 once the bit and the pedestal are in place. This ensures that the surface 20 having the desired radius of curvature which is burned into the pedestal 14 by the torch 50 is burned into the pedestal 14 at a proper position such that when the pedestal 14 is placed on the drum the bit point of the bit is at the predetermined position after the bit block 16 is attached to the pedestal 14. It should be noted that the shorter the arm is with respect to the axis 54 of rotation, the greater the radius of curvature of the surface 20 shall be.

Once the burning step is complete, the next step is to properly position the bit block 16 relative to the drum 15. This is accomplished by first attaching the bit block 16 to the nipple 28. The position of the bit block 16 with respect to the nipple 28 after being attached thereto is such that the position of the bit point of a bit that would be held by the bit block 16 is known, and the bit block 16 is fixed with respect to the bit point. The first swivel head 29 to which the nipple 28 is attached is then rotated such that the bit block 16 is at the predetermined angle $\phi$ from the first prechosen line 24. Note that movement of the first swivel head 29 does not cause movement of the bit point relative to the bit block 16 held by the nipple 28.

The vertical rack and pinion mechanism 42 of the vertical slide is then caused to position the bit point of the bit, that is known with respect to the nipple 28, at a predetermined distance r from the axis 26 of the drum 15. Next, the horizontal rack and pinion mechanism 44 of the horizontal slide is caused to move the horizontal slide such that the bit point of the bit is at a predetermined distance z from the prechosen end 34 of the drum 15. The drum 15 is then rotated with the use of the angular rack and pinion mechanism 46 a predetermined angle $\theta$ from the second chosen line 38. The bit point is then at the predetermined position r, z, $\theta$ and $\phi$.

The pedestal 14 which has the surface 20 with the radius of curvature that corresponds to the radius of curvature of the surface 17 of the drum 15 is then placed on the drum 15 adjacent the bit block 16 held by the nipple 28. Next, the pedestal 14 is fixed to the drum 15. Then the bit block 16 is fixed to the pedestal while it is held in the desired position by the nipple 28. The aligning and burning process provides for the bit block 10 to be properly positioned so it contacts the pedestal 14. After fixing the bit block 16 to the pedestal 14, and the pedestal 14 to the drum 15 is complete, the bit block 16 is released from the nipple 28.

It should be noted that the ability of the nipple 28 to hold the bit block 16 at the angle $\phi$ to provide alignment to the pedestal 14, which is also at the angle $\phi$ with respect to the axis 26 of the drum 15, is due to the fact that the torch burned the surface 20 having radius of curvature into the pedestal 14 at the angle $\phi$. Thus, when a bit is inserted into the bit block 16, that is attached to the pedestal 14, which is fixed to the drum 15, the bit point of the bit is at the predefined position to r, z, $\theta$ and $\phi$.

FIG. 5 shows one example of a nipple 28. The nipple 28 is held by the first swivel head with the use of, for instance, first and second plugs (not shown) that are inserted into a first hole 82 and a second hole 84, respectively, and through corresponding holes (not shown) in the first swivel head. The first hole 82 is fixed with respect to where a bit point of a bit would be, if inserted into a bit block 16 held by the nipple 28. The second hole 84 is formed in the nipple 28 corresponding to a desired angle of attack of the bit. (An angle of attack is the angle relative to the drum surface 77 at which the bit point enters the rock or coal that is being dug out). By changing the location of the second hole, the nipple 28 is caused to attach to the first swivel head at a corresponding orientation, with the nipple 28 rotating about the first hole 82. The bit block 16 attached to the nipple is positioned accordingly with a desired angle of attack. Since the bit point is fixed relative to the first hole 82, the bit point is always determined, regardless of the angle of attack of the bit holder. A different nipple 28 is required for each angle of attach that is desired to be used with the drum 15.

The bit block 16 is held, for instance, by the nipple 28 with a third plug not shown that is inserted through a third hold 86 in the nipple and a corresponding hole in the bit block 16. For different sizes of bit blocks 16, different size nipple lengths are required. The first hole 82 stays the same relative to the nipple 28 except that the third hole 86 is moved up or down depending on the length of the bit block 16 so the longer or shorter bit block can be accommodated relative to the first hole 82 and the bit point that is fixed relative to the first hole 82.

Referring to FIGS. 6a through 6h, there is shown a variety of different angular relationships of the pedestal 14 and bit block 16 to the drum. FIG. 6a shows one pedestal 14 having two bit blocks 16 mounted on an end ring 69 of drum 15 with their corresponding bit points (which are identified with an x) at different angular and radial positions but the same z position. FIG. 6b shows the pedestal 14 with two bit blocks 16 mounted on an end ring 69 of drum 15 having bit points at the same z position and $\phi$ position but different radial positions. FIG. 6c shows a pedestal 14 with a bit block 16 having at least a different $\phi$ position than the bit blocks shown in FIGS. 6a and 6b.

FIGS. 6d, 6e and 6f show a pedestal 14 and a bit block 16 but with the bit block 16 at a different angle $\phi$ in each Figure. FIG. 6f shows a bit block 16 that is at an angle $\phi$ of zero, which translates to the bit block and corresponding bit point being at an angle of 90° with respect to the drum axis 26.

FIGS. 6g and 6h show a pedestal 14 and a bit block 16 but with the pedestal 14 being much smaller than that shown in FIGS. 6a through 6f. FIG. 6g shows the bit block 16 and corresponding bit point at 90° with respect to the drum axis 26. FIG. 6h shows a bit block with a corresponding bit point having the same radial distance from the drum axis 26 but with an angle $\phi$ other than that of zero. Note how in all the FIGS. 6a through 6h the bit block 16 forms a flush contact 70 with the pedestal 14. As discussed above, that is the advantage of the nipple being able to hold the bit block 16 in a predetermined position $\phi$ as well as predetermined positions r and z with respect to the drum axis 26. Also note that the surface 20 that is burned into the pedestal 14 by the torch 50 is such that when the pedestal 14 rests on the drum surface 17, the top of the pedestal 14 is aligned properly with the bottom of the bit block 16 such that the flush contact 70 is formed. In mining, this is of great advantage since the stresses experienced by the pedestal 14 and bit block 16 are very great when the bit is digging into, for instance, a coal seam.

In general, a method which provides for the placement of a bit point of a bit at a predetermined position with respect to a rotatable member such as a drum comprises the steps of burning into a holder a surface which corresponds to a portion of the surface of the member; and fixing the holder on the member such that the surface burned into the holder is adjacent to the portion of the surface of the member, and the bit point of the bit is capable of being held by the holder at a predetermined position. Preferably, the surface burned into the holder has a radius of curvature corresponding to the radius of curvature of a drum 15, when a drum is the rotatable member.

If the holder is comprised of a pedestal 14 and a bit block 16, the burning step includes the step of burning into the pedestal 14 a surface 20 having a radius of curvature which corresponds to the radius of curvature of the surface 17 of the drum 15. The fixing step then includes the steps of attaching the pedestal 14 to the drum 15 such that the surface 20 burned into the pedestal 14 is adjacent the surface 17 of the drum 15, and securing the bit block 16 to the pedestal 14 such that the bit point of the bit is capable of being held by the bit block 16 at the predetermined position.

Preferably, before the attaching step there are the steps of positioning the bit block 16 at a predetermined angle $\phi$ from a first prechosen line 24. The first prechosen line 24 extends perpendicularly from the axis 26 of the drum 15 and through the bottom of the bit block 16. There is next included the step of positioning the bit block 16 such that the position of the bit point of the bit with respect to the bit block 16 is at a predetermined distance r from the axis 26 of the drum 15. Next there is the step of positioning the bit block 16 such that the position of the bit point of the bit with respect to the bit block 16 is at a predetermined distance z from a prechosen end 34 of the drum 15. The next step involves rotating the drum 15 a predetermined angle from a second prechosen line 38. The second prechosen line 38 extends perpendicularly from the axis 26 of the drum 15. After these steps are accomplished the pedestal 14 is capable of being attached to the surface of the drum and the bit block 16 is capable of being attached to the pedestal 14 at the angle $\phi$ and the bit point of the bit is capable of being held by the bit block 16 at the position r, $\theta$ and z with respect to the drum.

Referring to the burning step, this step can include the steps of positioning a torch 50 a predetermined distance from the axis 54 of rotation, and the step of placing the pedestal 14 a predetermined distance from the axis 54 of rotation.

The step of placing the pedestal 14 the predetermined distance from the axis 54 of rotation can include the step of placing the pedestal 14 at a position with respect to the torch 50 such that the surface 20 having its radius of curvature which is burned into the pedestal 14 can be attached to the drum 15 so that after the bit block 16 is secured to the pedestal 14, the bit block is positioned at a predetermined angle $\phi$ from the first prechosen line 24.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method which provides for the placement of a bit point of a bit at a predetermined position with respect to a rotatable member comprising the steps of:
   burning into a holder a surface which corresponds to a portion of the surface of the member; and
   fixing the holder on the member such that the surface burned into the holder is adjacent the portion of the surface of the member, and the bit point of the bit is capable of being held by the holder at the predetermined position.

2. A method as described on claim 1 wherein the member is a drum, and the surface burned into the holder has a shape corresponding to the shape of the surface of the drum.

3. A method as described in claim 2 wherein the holder is comprised of a pedestal and a bit block, wherein the burning step includes the step of burning into the pedestal a surface having a radius of curvature which corresponds to a radius of curvature of the surface of the drum and wherein the fixing step includes the steps of attaching the pedestal to the drum such that the surface burned into the pedestal is adjacent the surface of the drum, and securing the bit block to the pedestal such that the bit point of the bit is capable of being held by the bit block at the predetermined position.

4. A method as described on claim 3 wherein before the attaching step there are the steps of positioning the bit block at a predetermined angle φ from a first prechosen line extending perpendicularly from the axis of the drum and through the bottom of the bit block; positioning the bit block such that the position of the bit point of the bit with respect to the bit block is at a predetermined distance r from the axis of the drum; positioning the bit block such that the position of the bit point of the bit with respect to the bit block is at a predetermined distance z from a prechosen end of the drum; rotating the drum a predetermined angle θ from a second prechosen line extending perpendicularly from the axis of the drum such that after the pedestal is attached to the surface of the drum the bit block is capable of being attached to the pedestal at the angle φ and the bit point of the bit is capable of being held by the bit block at the position r, θ and z with respect to the Drum.

5. A method as described in claim 4 wherein the burning step includes the steps of positioning a torch a predetermined distance from an axis of rotation, and placing the pedestal a predetermined distance from the axis of rotation.

6. A method as described in claim 5 wherein the step of placing the pedestal the predetermined distance from the axis of rotation includes the step of placing the pedestal at a position with respect to the torch such that the surface having the radius of curvature which is burned into the pedestal can be attached to the drum so that after the bit block is secured to the pedestal the bit block is positioned at a predetermined angle φ from the first prechosen line.

7. A method as described in claim 6 including before step of positioning the bit block at a predetermined angle φ the step of positioning the bit block such that the bit point of the bit held by the bit block has a predefined angle of attack.

8. A method which provides for the placement of a bit point of a bit at a predetermined position with respect to a rotatable member comprising the steps of:
   positioning the bit block at a predetermined angle φ from a first prechosen line extending perpendicularly from the axis of the rotatable member and through the bottom of the bit block; positioning the bit block such that the position of the bit point of the bit with respect to the bit block is at a predetermined distance r from the axis of the rotatable member; positioning the bit block such that the position of the bit point of the bit with respect to the bit block is at a predetermined distance z from a prechosen end of the rotatable member; rotating the rotatable member a predetermined angle θ from a second prechosen line extending perpendicularly from the axis of the rotatable member such that after the pedestal is attached to the surface of the rotatable member the bit block is capable of being attached to the pedestal at the angle φ and the bit point of the bit is capable of being held by the bit block at the position r, θ and z with respect to the rotatable member; attaching a pedestal to the rotatable member; and
   securing a bit block to the pedestal such that the bit point of the bit is capable of being held by the bit block at the predetermined position.

9. A method as described in claim 8 including before the step of positioning the bit block at a predetermined angle φ the step of positioning the bit block such that the bit point of the bit held by the bit block has a predefined angle of attack.

10. A method for burning a surface into a pedestal that corresponds to a surface of a rotatable member comprising the steps of:
    positioning a torch a predetermined distance from an axis of rotation;
    placing the pedestal a predetermined distance from the axis of rotation; and
    burning the surface into the pedestal with the torch.

11. A method as described in claim 10 wherein the step of placing the pedestal the predetermined distance from the axis of rotation includes the step of placing the pedestal at a position with respect to the torch such that the surface which is burned into the pedestal can be attached to the rotatable member so that after a bit block is secured to the pedestal the bit block is positioned at a predetermined angle φ.

12. A method which provides for the placement of a bit point of a bit at a predetermined position with respect to a rotatable member comprising the steps of:
    aligning a bit block with respect to the rotatable member such that the bit point of the bit is capable of being held by the bit block at the predetermined position; and
    securing the bit block to the rotatable member with the bit point of the bit at the predetermined position.

13. A method which provides for the placement of a bit point of a bit at a predetermined position with respect to a rotatable drum comprising the steps of:
    positioning a torch a predetermined distance from an axis of rotation;
    placing a pedestal a predetermined distance from the axis of rotation;
    placing the pedestal at a position with respect to the torch such that the surface having a shape corresponding to the shape of the surface of the drum can be burned into the pedestal;

burning into the pedestal the surface having a shape which corresponds to the shape of the surface of the drum;

positioning the bit block at a predetermined angle $\phi$ from a first prechosen line extending perpendicularly from the axis of the drum and through the bottom of the bit block;

positioning the bit block such that the position of the bit point of the bit with respect to the bit block is at a predetermined distance r from the axis of the drum;

positioning the bit block such that the position of the bit point of the bit with respect to the bit block is at a predetermined distance z from a prechosen end of the drum;

rotating the drum a predetermined angle $\theta$ from a second prechosen line extending perpendicularly from the axis of the drum such that after the pedestal is attached to the surface of the drum the bit block is capable of being attached to the pedestal at the angle $\phi$ and the bit point of the bit is capable of being held by the bit block in the position r, $\theta$ and z with respect to the drum;

attaching a pedestal to the drum such that the surface burned into the pedestal is adjacent the surface of the drum; and securing the bit block to the pedestal such that the bit point of the bit is capable of being held by the bit block at the predetermined position.

* * * * *